(12) United States Patent
Dumais et al.

(10) Patent No.: US 7,693,817 B2
(45) Date of Patent: Apr. 6, 2010

(54) SENSING, STORING, INDEXING, AND RETRIEVING DATA LEVERAGING MEASURES OF USER ACTIVITY, ATTENTION, AND INTEREST

(75) Inventors: Susan T. Dumais, Kirkland, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 11/172,121

(22) Filed: Jun. 29, 2005

(65) Prior Publication Data

US 2007/0016553 A1    Jan. 18, 2007

(51) Int. Cl.
G06F 7/00 (2006.01)
G06F 17/30 (2006.01)

(52) U.S. Cl. .............. 707/2; 707/7; 707/104.1
(58) Field of Classification Search ........... 707/1–10, 707/100–104.1, 200–206
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,924,096 A * | 7/1999 | Draper et al. ............. | 707/10 |
| 6,353,398 B1 | 3/2002 | Amin et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,672,506 B2 | 1/2004 | Swartz et al. | |
| 6,741,188 B1 | 5/2004 | Miller et al. | |
| 6,747,675 B1 | 6/2004 | Abbott et al. | |
| D494,584 S | 8/2004 | Schlieffers et al. | |

(Continued)

FOREIGN PATENT DOCUMENTS

WO    9800787    1/1998

OTHER PUBLICATIONS

Bernard Merialdo, tagging text with a probabilistic model, 1991, IEEE, 809-812.*

(Continued)

*Primary Examiner*—Jean B Fleurantin
(74) *Attorney, Agent, or Firm*—Wolf, Greenfield & Sacks, P.C.

(57) ABSTRACT

Various components and processes are provided to enable data processing on multiple data types where aspects of the history of user activity, attention, interest, location, or other interaction with data is determined and employed to enhance information storage and access. In one particular aspect, a data manipulation system is provided. The system includes one or more data items that are associated with one or more tags and indicate at least one user's interaction or activity with the data items. A manipulation tool that processes the data items to determine a subset of data items based at least in part on the user's interaction with the data items. Methods are described for using the manipulation tool to weight terms in an index, to compress indexes, to influence the rank of items returned in a search, to generate additional queries for data items either automatically or with user direction, or for improved presentation of data items.

17 Claims, 9 Drawing Sheets

U.S. PATENT DOCUMENTS

| | | | |
|---|---|---|---|
| 6,791,580 | B1 | 9/2004 | Abbott et al. |
| 6,796,505 | B2 | 9/2004 | Pellaumail et al. |
| 6,801,223 | B1 | 10/2004 | Abbott et al. |
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,171,378 | B2 | 1/2007 | Petrovich et al. |
| 7,195,157 | B2 | 3/2007 | Swartz et al. |
| 7,385,501 | B2 | 6/2008 | Miller |
| 2001/0030664 | A1 | 10/2001 | Shulman et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083031 | A1 | 6/2002 | De Varax |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2004/0003042 | A1* | 1/2004 | Horvitz et al. ............... 709/204 |
| 2004/0201500 | A1 | 10/2004 | Miller et al. |
| 2005/0033777 | A1 | 2/2005 | Moraes et al. |
| 2005/0034078 | A1 | 2/2005 | Abbott et al. |
| 2005/0086243 | A1 | 4/2005 | Abbott et al. |
| 2005/0199716 | A1* | 9/2005 | Shafer et al. ................ 235/385 |
| 2005/0266858 | A1 | 12/2005 | Miller et al. |
| 2005/0272442 | A1 | 12/2005 | Miller et al. |
| 2006/0010206 | A1 | 1/2006 | Apacible et al. |
| 2006/0019676 | A1 | 1/2006 | Miller et al. |
| 2007/0006098 | A1 | 1/2007 | Krumm et al. |
| 2007/0071209 | A1 | 3/2007 | Horvitz et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |
| 2008/0319727 | A1 | 12/2008 | Horvitz et al. |
| 2009/0006297 | A1 | 1/2009 | Horvitz et al. |
| 2009/0055752 | A1 | 2/2009 | Abbott et al. |
| 2009/0234724 | A1 | 9/2009 | Bates et al. |

OTHER PUBLICATIONS

Schilit et al., Context-Aware Computing Applications, Dec. 8-9, 1994, IEEE, 85-90.*
Kai-Sang Leung., Interactive constrained frequent-pattern mining system, Jul. 7-9, 2004, IEEE, 49-58.*
Alan Wexelblat, et al. Footprints: Visualizing Histories for Web Browsing. Accessed online Jun. 27, 2005: http://www.wex.www.media.mit.edu/people/wex. Jul. 7, 1997. 13 pages.
Alan Wexelblat. History-Based Tools for Navigation. Proceedings of the 32nd Hawaii International Conference on System Sciences—1999. 12 pages.
Will Hill, et al. History-Enriched Digital Objects. CFP 1993, 5 pages.
William C. Hill, et al. Edit Wear and Read Wear. Chi '92, May 3-7, 1992. pp. 3-9.
Steve Fox, et al. Evaluating Implicit Measures to Improve Web Search. ACM Transactions on Information Systems, vol. 23, No. 2, Apr. 2005, pp. 147-168.
Diane Kelly, et al. Implicit Feedback for Inferring User Preference: A Bibliography. SIGR Forum, vol. 37, Issue 2, 2003. 11 pgs.
Vannevar Bush. As We May Think. The Atlantic Monthly, Jul. 1945, 12 pages.
Alan Daniel Wexelblat. Footprints: Interaction History for Digital Objects. Massachusetts Institute of Technology, 1999. 147 pages.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Ser. No. 00/20685, 3 Pages.
Robert M. Losee, Jr., Minimizing information overload: the ranking of electronic messages, Journal of Information Science 15, Elsevier Science Publishers B.V., 1989, pp. 179-189.
International Search Report and Written Opnion dated Mar. 24, 2008 for PCT Application Serial No. PCT/US06/24847, 9 Pages.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt,A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994, pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computed Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitos Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on The Practical Application Of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999, 26 pages.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issues on Wearable Computing, 1997, 12 pages.

Workshop on Wearable Computing Systems, Aug. 19-21, 1996, 10 pages.

Mark Billinghurst, Research Directions in Wearable Computing, University of Washington, May 1998, 48 pages.

Mark Weiser, The Computer for the 21st Century, Scientific American, Sep. 1991, 8 pages.

* cited by examiner

SENSING, STORING, INDEXING, AND RETRIEVING DATA LEVERAGING MEASURES OF USER ACTIVITY, ATTENTION, AND INTEREST

BACKGROUND

Computer platforms provide many tools for storing and processing large and varying types of data sets. These can include word processing tools, data presentation tools, computer-aided graphics tools, electronic mail handling tools, calendar and scheduling tools, and numerous database manipulation tools. Given the various usages for data on the platform, applications have developed over time that are somewhat content centric. In other words, when data has been stored in the computer's database, the data is subsequently retrieved and/or manipulated in some manner based on the actual content of the stored data. In one specific example, an e-mail inbox can be searched for previously received e-mails based on a keyword that links a search tool to respective e-mails that are associated with the term, where the term is linked to the actual contents of stored e-mails. Thus, if a user were to search for the keyword "John," any e-mail associated with this keyword would be retrieved and presented to the user, whereby the user would subsequently sift through the retrieved list for the desired e-mail associated with the term "John." Although the specific e-mail the user is searching for may be retrieved in the resulting list of mail, a large number of e-mails may have to be subsequently searched in order to find the desired e-mail (e.g., thirty e-mails contain the term John). As can be appreciated, e-mail processing described in the above example can be extended to include many types of data processing and file manipulation activities. For instance these can include indexing of stored data, presentation of stored data, searching for various types of stored data, ranking data, indexing data, and so forth.

Relating to content-centric applications in general, one common view of a "finished" document that is to be retrieved, viewed, and employed by a reader is generally not sufficient to adequately support knowledge-intensive tasks. Thus, users or groups of users should also be able to add their own information to a knowledge source. In one example, a historian may want to add a detailed analysis to a chapter of a book. Another user may want to annotate a section of the book with experiences gathered from the analysis.

While practically all documents are available on or through the Web, its hypertext capabilities are currently not used as extensively to directly modify and annotate existing information (e.g., books, papers, web pages, and so forth). Rather, when content is deemed "completed" it is stored in some type of archive (e.g., a digital library), from which it is eventually retrieved as a monolithic entity, used for the production of yet more content. Moreover, the task of information retrieval is typically not integrated with the task of content development. Thus, the user has to retrieve documents they believe are required for a task and then base content development on the information found. While a new document search can always be initiated manually, it is a much more compelling view that content development and retrieval should be integrated. A system that continually scans and analyzes new text entered by a user should be able to search additional relevant information and present this to the user, who may then inspect the new data, integrate it, add cross-references, or reject the proposed sources, for example.

Another aspect is that knowledge from a source generally cannot be applied without a description of the context of both a document's creator and its reader. Only an explicit representation of the two context frames allows for a (semi-automatic) translation between them; in the above examples, old knowledge can be adapted to modem standards and vocabulary, but similar problems may increasingly appear in the medium and long-term future, when all documents that are currently created and stored in digital form become "historic knowledge" themselves.

Currently, users obtain documents through some type of indexing and ranking systems: web search engines for plain web pages, or some type of information retrieval systems for digital libraries (historically, these systems come from different roots, but modernm implementations exhibit some overlap between these techniques). In either case, the systems usually return complete documents, be it web pages, papers, or whole books. This is one of the primary reasons behind the feeling of "information overload" shared by many users with a virtually endless source of information to process.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In contrast to pure content-centric data processing applications, metadata tags associated with files or applications can be employed to facilitate effective information storage of and/or access to information. User activities or interactions with data such as associated with respective files or applications represent an especially interesting and effective type of metadata and are the focus of many applications. As users process data overtime, their activity with the data can be monitored and weighted according to the type and intensity of the activity. For instance, if a user heavily interacts with a particular file by adding and removing text from the file on a frequent basis, a score or weight can be assigned to the file in metadata or other format to indicate such activity.

In another instance, if a file is rarely interacted with (e.g., opened one time within a year), this relative inaction with the file can cause a lower weight to be assigned—indicating possibly the lower importance of the file to the user. As can be appreciated, scores or weights can be assigned over a broad range of file usage activities and for a plurality of differing activities such as creating, opening, viewing, scrolling, editing, printing, annotating, saving, forwarding, and so forth. The activity weights or patterns can then be associated with data items (e.g., tagged to a column in a database), subsection of items, or groups of items. The activity weight can then later be employed with a data manipulation tool such as a search utility for example, to refine a larger set of data items into a smaller or more manageable set of items. For example, instead of merely searching a set of data items for a content-centric keyword, searching for information can be augmented via activity enhanced clues to more efficiently retrieve desired data of interest (e.g., find all files that were forwarded to a particular user, find a subset of presentations that have been most heavily utilized for other applications, determine paragraph that was last edited, and so forth).

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
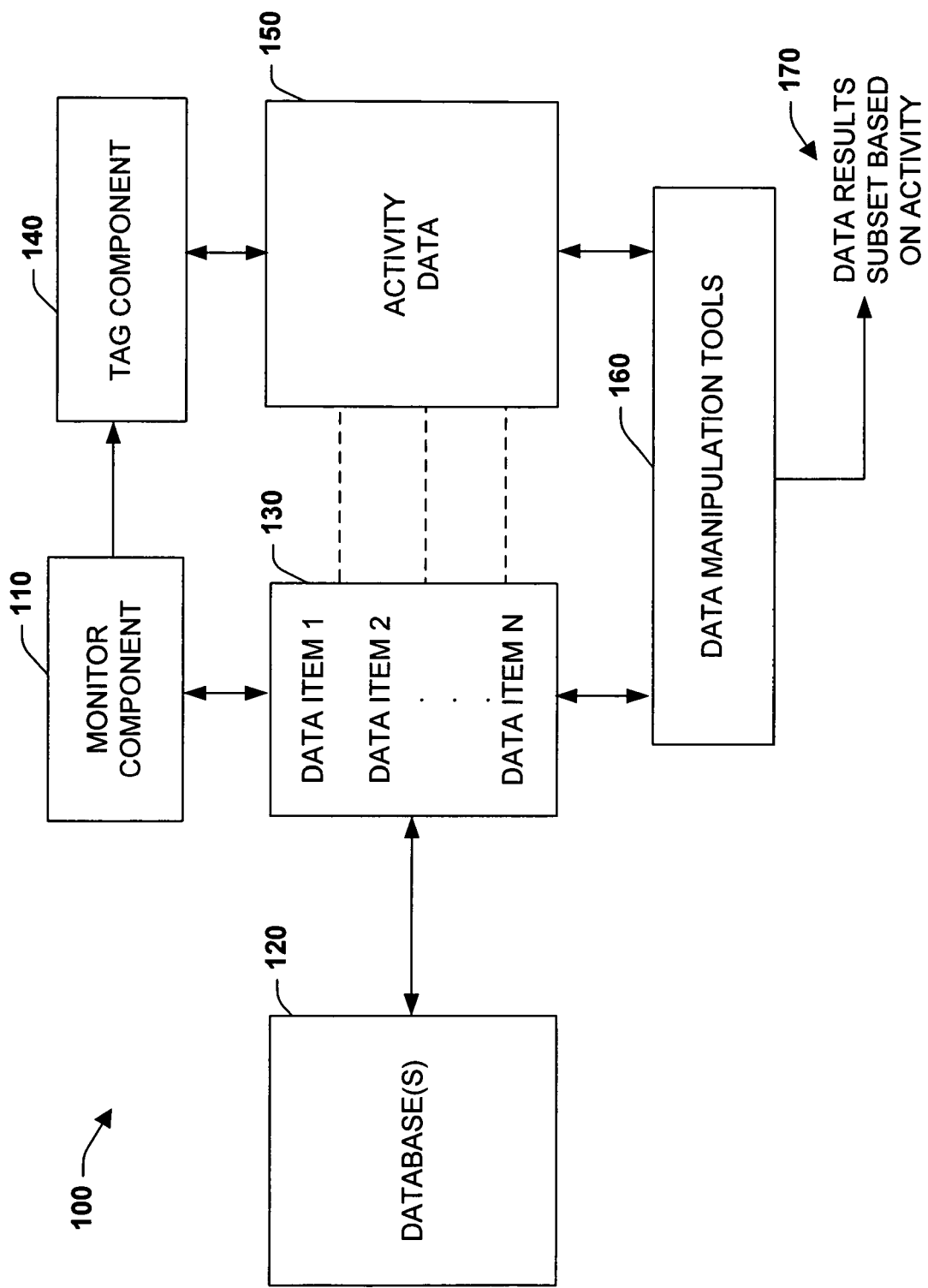
FIG. 1 is a schematic block diagram illustrating a data processing system that employs user activity or interaction data.

Various components and processes are provided to enable data processing on multiple data types where user activity or interaction with data is determined and employed to further process the data in accordance with the activity. For example, the activity or interaction can be monitored and subsequently tagged to a data item (e.g., activity of file interactions assigned a weight and applied to a column in a database) to later be employed for searching, indexing, cataloging, ranking, or viewing of various data items (or item subsets) residing in a database. In one particular aspect, a data manipulation system is provided. The system includes one or more data items that are associated with one or more tags and indicate at least one user's interaction with the data items. A manipulation tool (e.g., search tool) processes the data items to determine a subset of data items based at least in part on the user's interaction with the data items.

As used in this application, the terms "component," "system," "tag," "monitor," "model," "query," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Referring initially to FIG. 1, a system 100 illustrates a data processing architecture that employs user activity or interaction data to perform various computer-related tasks. A monitor component 110 observes data interactions overtime with one or more databases 120 that store one or more data items 130. Monitoring can occur via a background and/or foreground component (not shown) and employed to determine when the data items 130 are interacted with by users. For instance, this can include observing when files are opened or closed, edited, added to or deleted from, read or written to, cut, pasted, last edited, forwarded, replied to, sent to, last viewed, the amount of time viewed, time interacted with over a time horizon, attentional annotations indicating how long the item 130 or different subcomponents of the item was the focus of attention, and so forth.

When an application or file is open and a particular data item 130 is being acted upon from within an application, various techniques can be employed to determine activities within the application. These can include monitoring how long a user dwells on a particular set or subset of data, what data has been modified or observed, how often and over what time span the data has been operated upon and so forth. A tag component 140 assigns weights or scores according to monitored data activities. These can be probabilistically assigned, if desired (or other weighting classification), and can reflect the amount or pattern of the user's interaction with a given piece of data or application. For instance, minimal file usage may generate a lower weight than an extensive editing of the file. When the weights or scores have been determined, the determined weight information for activity is associated or tagged to one or more data items and is illustrated as activity data 150. This association can occur within the database 120 for example such as creating or modifying values in a column or columns of the database 120 to indicate the weighting or importance of a particular item identified in a row of the database 120 for the metadata tag of interest. It is to be appreciated that the columns are logical entities and could either be stored explicitly or computed dynamically at the time of usage. Other type associations could include a metadata reference that is directly or indirectly assigned to one or more data items 130.

The tags and data items 130 can be applied with one or more data manipulation tools which can employ user activity information derived from the tags to augment information storage (e.g., efficient index creation), information access (e.g., searching, filtering or ranking of items) and information presentation (e.g., to organize, arrange or present items) and so forth. At 170, results from the data manipulation tool 160 are automatically generated and can include a reduced subset of data items from a larger set of the data items 130. It is noted that as applied herein, the term subset can include all or a portion of the data items 130. Also, activity thresholds can be set-up within the tools 160 to include more or less of the data items 130 in the results 170.

In other aspects, content-based scores can be assigned for documents. For example, a score can be assigned based on the similarity of a user's query to the content of the document. Thus, when ranking, give more weight to terms that appear in documents or sections of a document that have been edited or the user has spent lots of time reading, for example. In yet another aspect of the system 100, activity data 150 can be employed to identify regions or terms of interest. Thus, differential weighting of document regions can be utilized to:

1) Compress an index to preferentially include terms in regions of interest;
2) Differentially weight terms in regions of interest for ranking;
3) Differentially weight terms in regions of interest for relevance feedback;
4) Automatically or semi-automatically generate queries based on regions of current user focus; and/or
5) Differentially present (via highlighting or other techniques) items or regions of items of interest.

The systems and methods described herein support a plurality of data processing applications. This includes processing data items such as documents, files, email messages, calendar appointments, web pages, sub-sections within the data items' or cross-item abstractions, for example. Applying tags to the data items can represent a location that a user last accessed an item, or represent a location history of times that a user has accessed or interacted with an item. The tag represents a time a user last accessed an item, a total number of times that an item has been accessed, represents a frequency that an item has been accessed, within a period of time extending into the past, or represents a frequency that an item has been accessed, within one or more arbitrarily specified periods of time. Other components can be provided that encode higher-order statistics of frequency of access over time. In one case, a viewer allows a user to retrieve items based on functions of one or more tags, allows a user to sort or filter retrieved items based on functions of one or more tags, or alternatively presents retrieved items based on functions of one or more tags. In another case, tags can be probabilistic indications of activity or interest.

Various processes include analysis of user activities with data items. This includes automatically tagging a quantity or nature of interaction that data items have received from computer users and employing the tags to further process the data items in accordance with future data activities. The processes can include storing data within an attentional annotation associated with the data items in a separate database or within a data structure embedded in the data items. Also, indexing procedures can be provided that weight subcomponents of data items differently for retrieval depending on a status of annotations indicating attention or interaction with data items. This includes indexing procedures that overlook or delete information in data items depending on a status of annotations indicating attention or interaction with data items. An index can be compressed by removing components that have not been attended to or interacted with by computer users or that are lesser attended to or interacted with components of data items.

In another aspect, a ranking score can be utilized for data retrieval, to yield more weight to terms or objects that appear in sections of a data item that a user has attended to or has interacted with. This can include employing attentional annotations to automatically or semi-automatically generate queries based on regions that have been attended to or interacted within the past and/or present. The attentional annotations can also be employed to provide differential access to items or differential display of items that have been attended to or interacted with in the past and/or present.

It is noted that attentional annotations can be encoded not only as attention to data items themselves but of attention to subcomponents of the items, where the annotation captures pointers or other indications of each of the subcomponents and the attention that has been received. For example, consider a large document such as 211 page document. The document may have been opened interacted with and attended to 23 times, for example which is captured as one type of attentional annotation for the document. However, other attentional annotations indicate that the user has repeatedly examined pages 4-6, 89-93, 123-124, and 198, for example,—and just skimmed quickly over other pages of the document. Thus, each subcomponent can be listed and the amount of attention that each portion of text can be encoded in the annotation.

Figure 2:
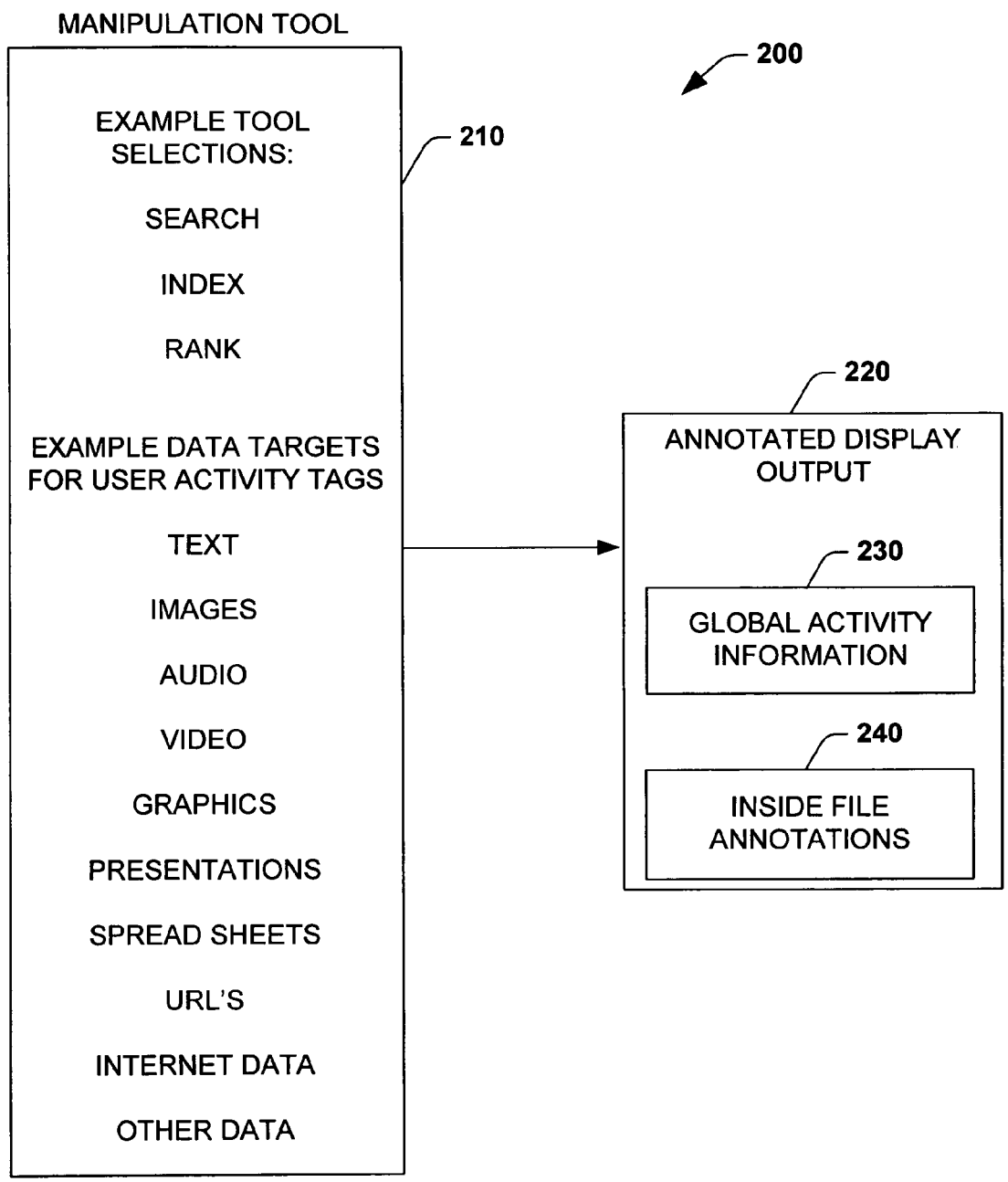
FIG. 2 illustrates an exemplary user interface that utilizes user activity or interaction data.

FIG. 2 illustrates an exemplary user interface 200 that utilizes user activity or interaction data. In this example, a manipulation tool 210 (e.g., user interface applied to a database), can be associated with an output or display 220. The tool 210 can include many features for processing data from one or more databases. For example, the tool 210 may include selections for enabling data searches, indexing or cataloging of data, ranking of data, and so forth. Such data can include textual data such as XML data or ASCII data for example. Other data includes image data, audio data, video data, graphics data, and/or presentation data such as contained in a series of slides, for example. Substantially any data type or application can be employed including spread sheets, Universal Resource Location (URL) information, Internet or Web data, and so forth. As noted above with respect to FIG. 1, such data can be tagged such as in a column or as file metadata to indicate a score or a weight that is indicative of the past usage or interactions. The manipulation tool can then search, retrieve, or process the tagged data to refine or determine more manageable subsets of data for users.

The output 220 from the tool 210 can be a file or an actual user interface display. For instance, if the tool were employed as a search engine within a database, the output could be a display of returned results. The returned information can be more global in nature as illustrated at 230. This may include highlighting or applying graphics to a file to indicate that one file or grouping of files have been selected because of their increased activity with the user. In an e-mail search tool for example, the tool 210 may be applied to search for all files that have the keyword computer and have had at least one graphical image associated with the file in the past month. Searches can be crafted in a plurality of ways and can include combinations of content searching, activity-based searching, and or combinations thereof. For instance, in this example, three e-mails out of a set of ten e-mails may be highlighted in one color as having a higher activity score than the other seven e-mails which are delineated in a different color. In another aspect at 240, information within a returned file or data set can be highlighted or annotated to indicate usage activity (e.g., paragraph within a file selected with different font format to highlight usage areas within the document).

Figure 3:
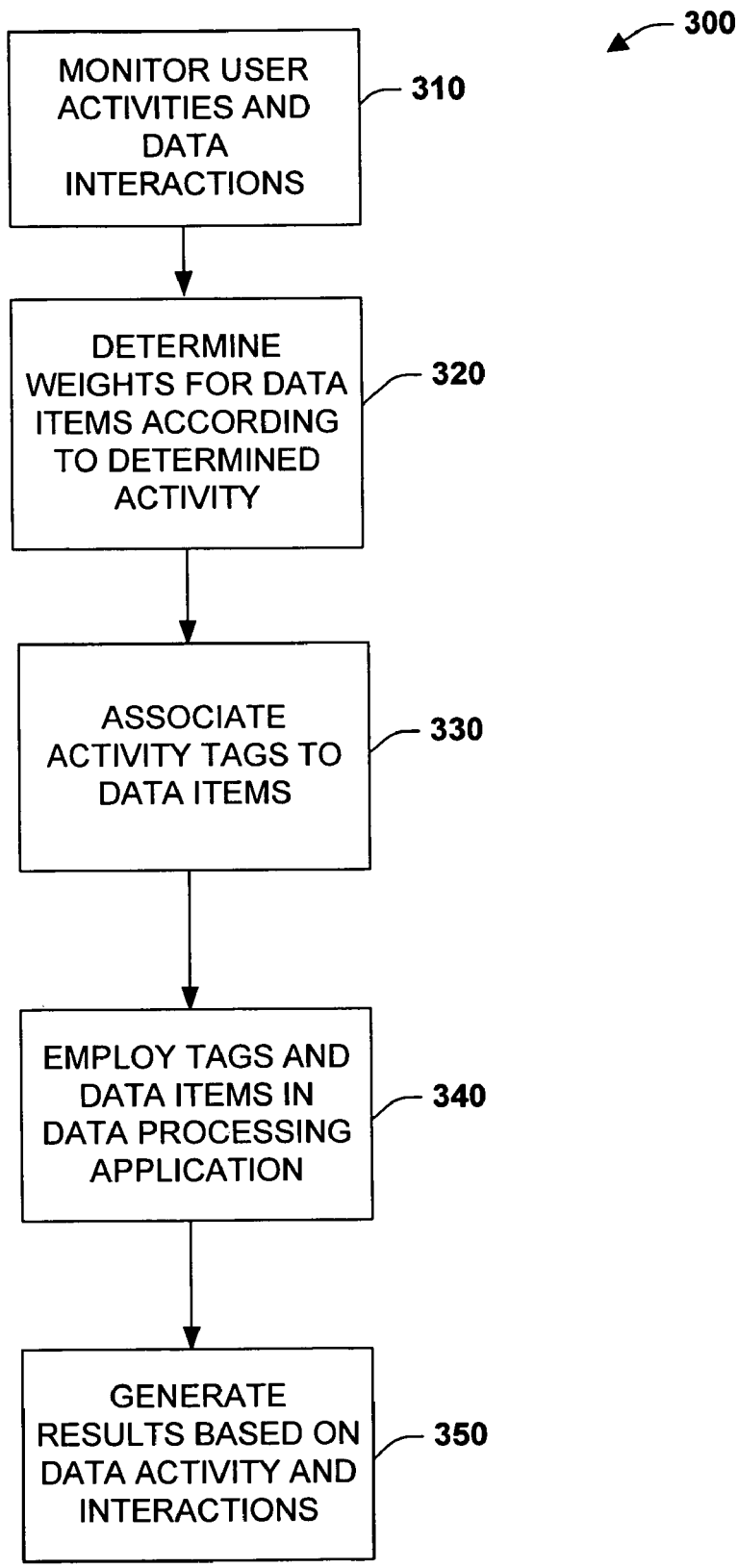
FIG. 3 illustrates a flow diagram illustrating a user activity determination and process.

FIG. 3 illustrates a process 300 for determining and applying user activity or interaction data. While, for purposes of simplicity of explanation, the methodologies are shown and described as a series or number of acts, it is to be understood and appreciated that the subject process is not limited by the order of acts, as some acts may, in accordance with the subject process, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject process.

Proceeding to 310, data interactions with one or more local or remote databases is monitored. Such monitoring can occur in a background and/or foreground application and is employed to determine when data or files are interacted with by users. For instance, this can include observing when files are opened or closed, edited, added to or deleted from, read or written to, and so forth. When an application is open and particular data is being operated upon from within an application, various techniques can be employed to determine activities within the application. These can include monitoring how long a user dwells on a particular set or subset of data, what data has been modified or observed and so forth. Outside monitoring can also be associated with the application to determine a user's interaction with the data, file or application. For instance, audio cues may be employed, automated facial recognition techniques, or explicit user instructions that a data set is highly relevant to the user.

At 320, weights for the monitored activities are determined. The weights can be probabilistically assigned and can reflect the amount of the user's interaction with a given piece of data or application. For instance, a very light perusal of a document may generate a lower weight than an extensive editing of the document. At 330, the determined weight information for activity is associated or tagged to one or more data items. The association can occur within the confines of a database for example such as tagging a column or columns of the database to indicate the weighting or importance of a particular item identified in a row of the database. Other type associations could include a metadata reference that is directly or indirectly assigned to one or more data items. At 340, the tags and data items can be applied with a data processing application. This can include utilizing the activity information derived from the tags to augment searches for items, to index items, to arrange items, to rank items, to organize items and so forth. At 350, results from the data processing application are generated. This can include explicit actions such as filtering a larger result set into a smaller subset or more subtle actions such as annotating a display to highlight files or data on the display which indicate those items that have been interacted with more by the user's.

Figure 4:
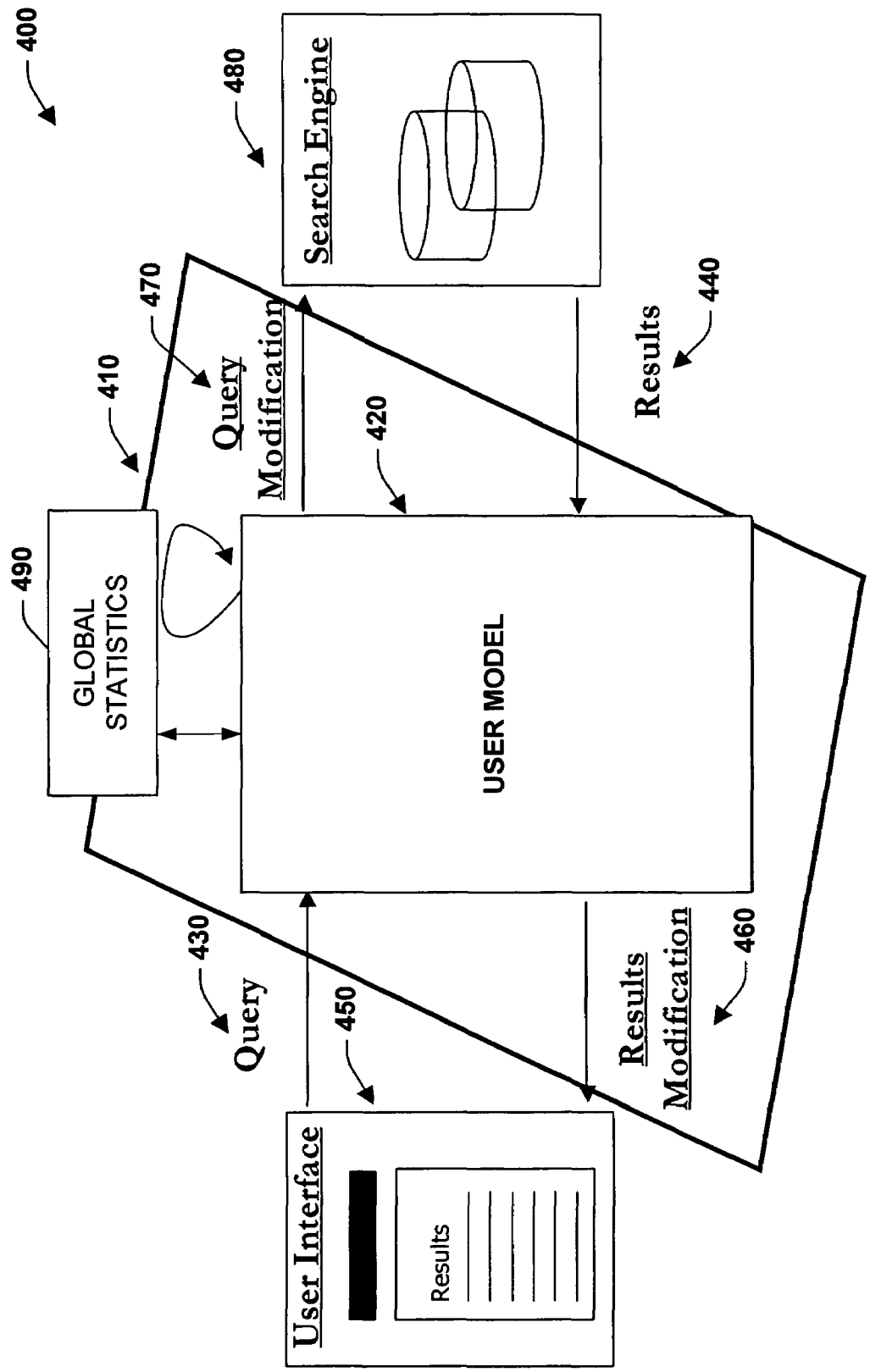
FIG. 4 illustrates an example system of an information retrieval architecture that can be employed with user activity data processing.

Refeffing to FIG. 4, an example system 400 illustrates an information retrieval architecture that can be employed with user activity data processing. The system 100 depicts a general diagram for personalizing search results, however other forms of data manipulation can be performed as described above. A personalization component 410 includes a user model 420 based on user activity as well as processing components (e.g., retrieval algorithms modified in accordance with the user model) for using the model to influence search results by modifying a query 430 and/or modifying results 440 returned from a search. A user interface 450 generates the query 430 and receives modified or personalized results based upon a query modification 470 and/or results modification 460 provided by the personalization component 410. As utilized herein, the term "query modification" refers to both an alteration with respect to terms in the query 430 and alterations in an algorithm that matches the query 430 to documents in order to obtain the personalized results 440. Modified queries and/or results 440 are returned from one or more local and/or remote search engines 480. A global database 490 of user statistics may be maintained to facilitate updates to the user model 420. As can be appreciated, the user model 420 and/or global statistics 490 can be associated with user activity or interaction data as previously described to facilitate data manipulation or processing.

Generally, there are at least two approaches to adapting search results based on the user model 420. In one aspect, query modification processes an initial input query and modifies or regenerates the query (via user model) to yield personalized results. Relevance feedback is a two-cycle variation of this process, wherein a query generates results that leads to a modified query (using explicit or implicit judgments about the initial results set) which yields personalized results that are personalized to a short-term model based on the query and result set. Longer-term user models can also be used in the context of relevance feedback. Further, query modifications also refer to alterations made in algorithm(s) employed to match the query to documents. In another aspect, results modification take a user's input as-is to generate a query to yield results which are then modified (via user model) to generate personalized results. It is noted that modification of results usually includes some form of re-ranking and/or selection from a larger set of alternatives which can include a consideration or weighting from determined activity data. Modification of results can also include various types of agglomeration and summarization of all or a subset of results.

Methods for modifying results include statistical similarity match (in which users interests and content are represented as vectors and matched to items), and category matching (in which the users' interests and content are represented and matched to items using a smaller set of descriptors). The above processes of query modification or results modification can be combined, either independently, or in an integrated process where dependencies are introduced among the two processes and leveraged.

Figure 5:
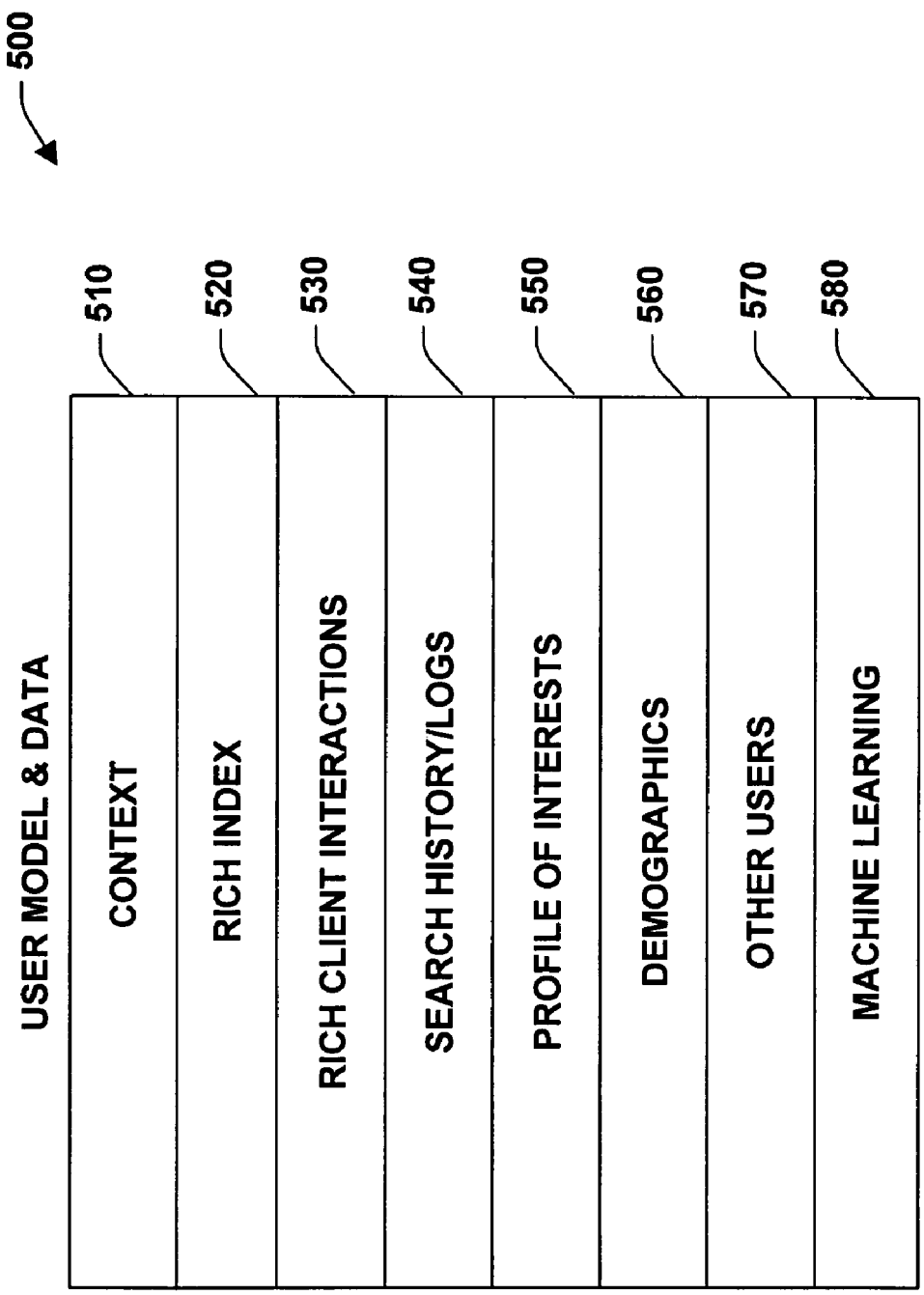
FIG. 5 illustrates an example user model that can be employed with user activity or interaction data.

Referring to FIG. 5, a user model 500 is illustrated that can be employed with user activity or interaction data. The user model 500 is employed to differentiate personalized searches from generalized searches and to facilitate rich data processing according to determined activity data. One aspect in successful personalization is to build a model of the user that accurately reflects their interests and is easy to maintain and adapt to changes regarding long-term and short-term interests. The user model can be obtained from a variety of sources, including but not limited to:

1) From a rich history of computing context at 510 which can be obtained from local, mobile, or remote sources (e.g., applications open, content of those applications, and detailed history of such interactions including locations).

2) From a rich index of content previously encountered at 520 (e.g., documents, web pages, email, Instant Messages, notes, calendar appointments, and so forth).

3) From monitoring client interactions at 530 including recent or frequent contacts, topics of interest derived from keywords, relationships in an organizational chart, appointments, and so forth.

4) From a history or log of previous web pages or local/remote data sites visited including a history of previous search queries at 540.

5) From profile of user interests at 550 which can be specified explicitly or implicitly derived via background monitoring.

6) From demographic information at 560 (e.g., location, gender, age, background, job category, and so forth).

From the above examples, it can be appreciated that the user model 500 can be based on many different sources of information. For instance, the model 500 can be sourced from a history or log of locations visited by a user over time, as monitored by devices such as the Global Positioning System (GPS). When monitoring with a GPS, raw spatial information can be convened into textual city names, and zip codes. The raw spatial information can be converted into textual city names, and zip codes for positions a user has paused or dwelled or incurred a loss of GPS signal, for example. The locations that the user has paused or dwelled or incurred a loss of GPS signal can be identified and convened via a database of businesses and points of interest into textual labels. Other factors include logging the time of day or day of week to determine locations and points of interest.

In other aspects, components can be provided to manipulate parameters for controlling how a user's corpus of information, appointments, views of documents or files, activities, or locations can be grouped into subsets or weighted differentially in matching procedures for personalization based on type, age, or other combinations. For example, a retrieval algorithm could be limited to those aspects of the user's corpus that pertain to the query (e.g., documents that contain the query term or past interaction with data). Similarly, email may be analyzed from the previous 1 month, whereas web accesses from the previous 3 days, and the user's content created within the last year. It may be desirable that GPS location information is used from only today or other time period. The parameters can be manipulated automatically to create subsets (e.g., via an optimization process that varies parameters and tests response from user or system) or users can vary one or more of these parameters via a user interface, wherein such settings can be a function of the nature of the query, the time of day, day of week, or other contextual or activity-based observations.

Models can be derived for individuals or groups of individuals at 570 such as via collaborative filtering techniques that develop profiles by the analysis of similarities among individuals or groups of individuals. Similarity computations can be based on the content and/or usage of items. It is noted that modeling infrastructure and associated processing can reside on client, multiple clients, one or more servers, or combinations of servers and clients.

At 580, machine learning techniques can be applied to learn user characteristics and interests over time as well as how and when data is interacted with by users. The learning models can include substantially any type of system such as statistical/mathematical models and processes for modeling users and determining preferences and interests including the use of Bayesian learning, which can generate Bayesian dependency models, such as Bayesian networks, naïve Bayesian classifiers, and/or other statistical classification methodology, including Support Vector Machines (SVMs), for example. Other types of models or systems can include neural networks and Hidden Markov Models, for example. Although elaborate reasoning models can be employed, it is to be appreciated that other approaches can also utilized. For example, rather than a more thorough probabilistic approach, deterministic assumptions can also be employed (e.g., no recent searching for X amount of time of a particular web site may imply by rule that user is no longer interested in the respective information). Thus, in addition to reasoning under uncertainty, logical decisions can also be made regarding the status, location, context, interests, focus, and so forth of the users.

The learning models can be trained from a user event data store (not shown) that collects or aggregates data from a plurality of different data sources. Such sources can include various data acquisition components that record or log user event data (e.g., cell phone, acoustical activity recorded by microphone, Global Positioning System (GPS), electronic calendar, vision monitoring equipment, desktop activity, web site interaction and so forth). It is noted that the systems can be implemented in substantially any manner that supports personalized query and results processing. For example, the system could be implemented as a server, a server farm, within client application(s), or more generalized to include a web service(s) or other automated application(s) that interact with search functions such as user interfaces and search engines.

Before proceeding, collaborative filter techniques applied at 570 of the user model 500 are described in more detail. These techniques can include employment of collaborative filters to analyze data and determine profiles for the user. Collaborative filtering systems generally use a centralized database about user preferences to predict additional topics users may desire. Collaborative filtering is applied with the user model 500 to process previous user activities from a group of users that may indicate preferences for a given user that predict likely or possible profiles for new users of a system. Several algorithms including techniques based on correlation coefficients, vector-based similarity calculations, and statistical Bayesian methods can be employed.

Figure 6:
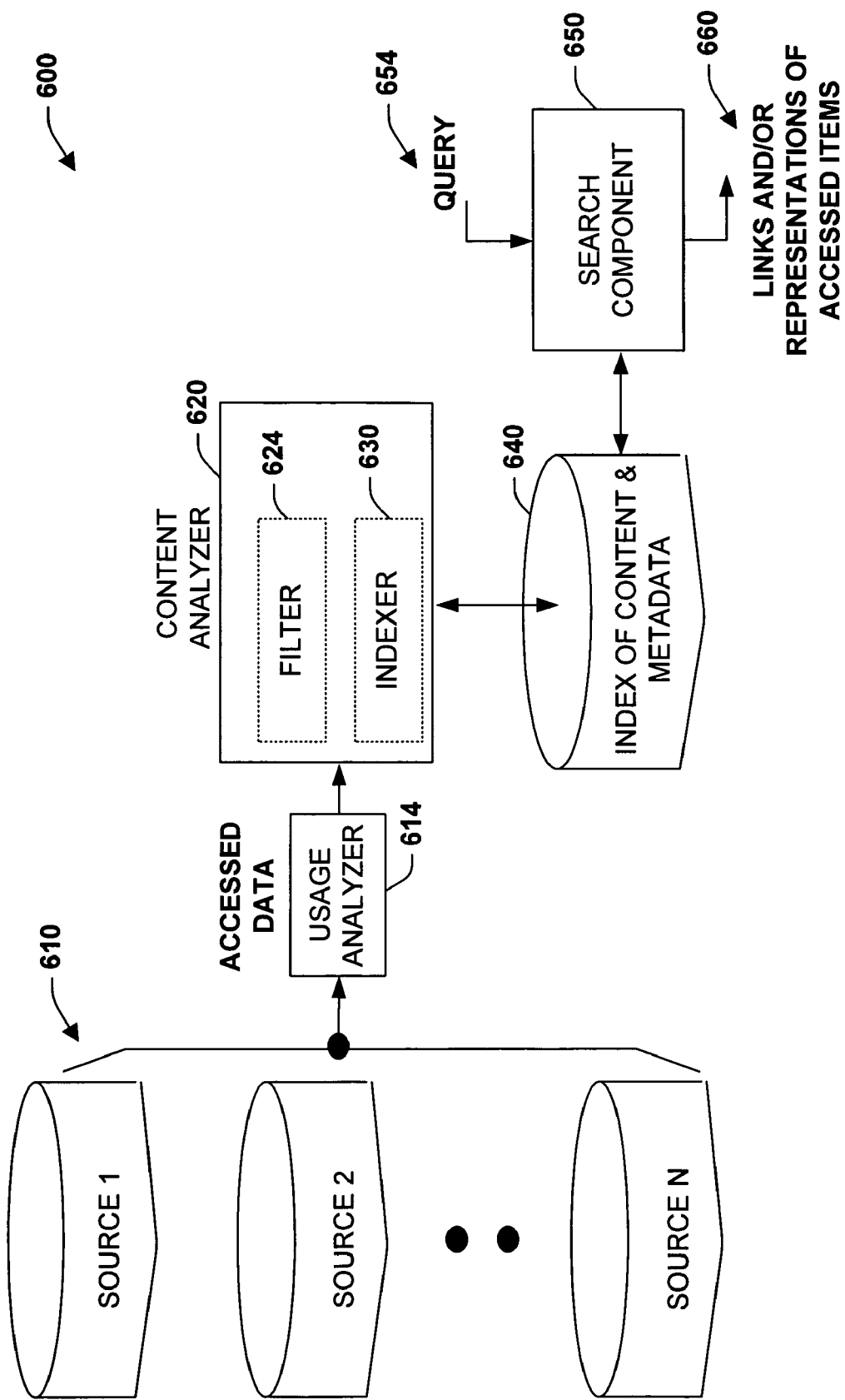
FIG. 6, a system diagram illustrates access-based information retrieval in accordance with user activity or interaction data.

Referring to FIG. 6, a system 600 illustrates access-based information retrieval in accordance with user activity or interaction data. The system 600 includes one or more information sources 610 that are accessed or considered by a user. These sources 610 can be similar or disparate in nature having dissimilar information content, whereby some of the information sources may represent local data locations such as files, folders, applications, images, audio files, appointments, email, and so forth, and other sources 610 may represent remote sources such as web information, for example. As the user accesses different types of information over time, a usage analyzer 614 passes this information to a content analyzer 620 (or monitor) which can operate as a background task locally on a client machine and/or remotely in accordance with a server, processes the accessed data via a filter 624 for parsing content from data, and an automated indexer 630 that creates a content index 640 (or activity tags) of accessed data items.

In general, the analyzer 620 creates representations of accessed data in the index 640. For example, if the user has accessed a web page, the content analyzer 620 may create a thumbnail representation of the web page and associate a hyperlink reference to the page and thumbnail as part of a metadata file. The representation could be further tailored to reflect detailed patterns of user interaction with the page. In another case, if the user then accessed a text document having images contained therein, the analyzer 620 may extract the text or portions thereof, and associate a database link such as a file path as part of metadata. The indexer 630 would then automatically create an index (or add to an existing index) having two items in the content index 640—the thumbnail representation and text document representation including metadata. In general, filters analyze the content of and metadata associated with items. Thus, for a Word document, for example, the filter 624 extracts metadata such as filename, title, author, keywords, creation date, and so forth along with the words in the document. This is what is used to build the index 640. The creation of thumbnails and the analysis of images could also be encapsulated in the filter 624, if desired. Activity or interaction metadata can be employed that may contain other items such as user and/or implicit tags that describe the items stored in the content index 640. It is to be appreciated that the indexer 630 may also perform filter 624 functions (e.g., indexer associates metadata with filtered content).

A search component 650 is provided that receives a user query 654 for information items contained in the content index 640. The search component 650 can be provided as part of a user interface that returns links and/or representations of accessed items at 660 to the user in response to the query 654. For example, the user may query for "items relating to last years performance review," wherein the search component 650 extracts items from the index 640 such as emails, coworker evaluations, documents published in the last year, web page images, audio recordings and so forth relating to the context of the query 654. In another example, an implicit query may be derived from the query 654 (e.g., whenever I get a phone call from this person, pull-up last five e-mails from this person).

As will be described in more detail below, accessed items can be presented in a plurality of differing formats designed to facilitate efficient and timely retrieval of information items that have been previously accessed. Also, the links and/or representations 660 may include other items of interest to the user such as providing information items that the user may want to see other than those items previously accessed (e.g., system provides links to other content of interest based upon or inferred from query at hand, e.g., in addition to showing performance review items, optionally provide links to human resources describing review policies based on another index of content even though these items may or may not have not been previously accessed by the user).

In one aspect, an event component can be provided (not shown) (e.g., background task that monitors user activities associated with usage analyzer 614). The event component monitors user activities such as saving, reading, editing, copying, hovering on information, selecting information, manipulating information and/or deleting files, for example, and makes determinations with respect to user actions. This can include sensors such as microphones, cameras, and other devices along with monitoring desktop activities to determine user actions or goals. In one example, probabilistic models and/or logical decisions can be applied to determine events such as when a user has observed or contemplated information. Logical and/or statistical models (e.g., Bayesian dependency models, decision trees, Support Vector Machines) can be constructed that consider the following example classes of evidence associated with patterns of user activity:

- Focus of attention: Selection and/or dwelling on items, dwelling on portions of a document or on specific subtext after scrolling through a document.
- Introspection: A pause after a period of activity or a significant slowing of the rate of interaction.
- Undesired information: Immediate closure of a document after a brief glance, attempts to return to a prior state after an information access action. These observations include undoing the effect of recent action, including issuing an undo command, and deleting items.
- Domain-specific syntactic and semantic content: Consideration of special distinctions in content or structure of documents and how user interacts with these features or items. These include domain-specific features associated with the task. (e.g., considering that rate and frequency of email messages, and the age in time or number of messages of a subject heading, from the author of a message at a user's focus of attention). As can be appreciated, the event component can be employed to trigger indexing of various types of information on the basis of user-activity. User's activity with information objects can also be utilized to improve information presentation.

Figure 7:
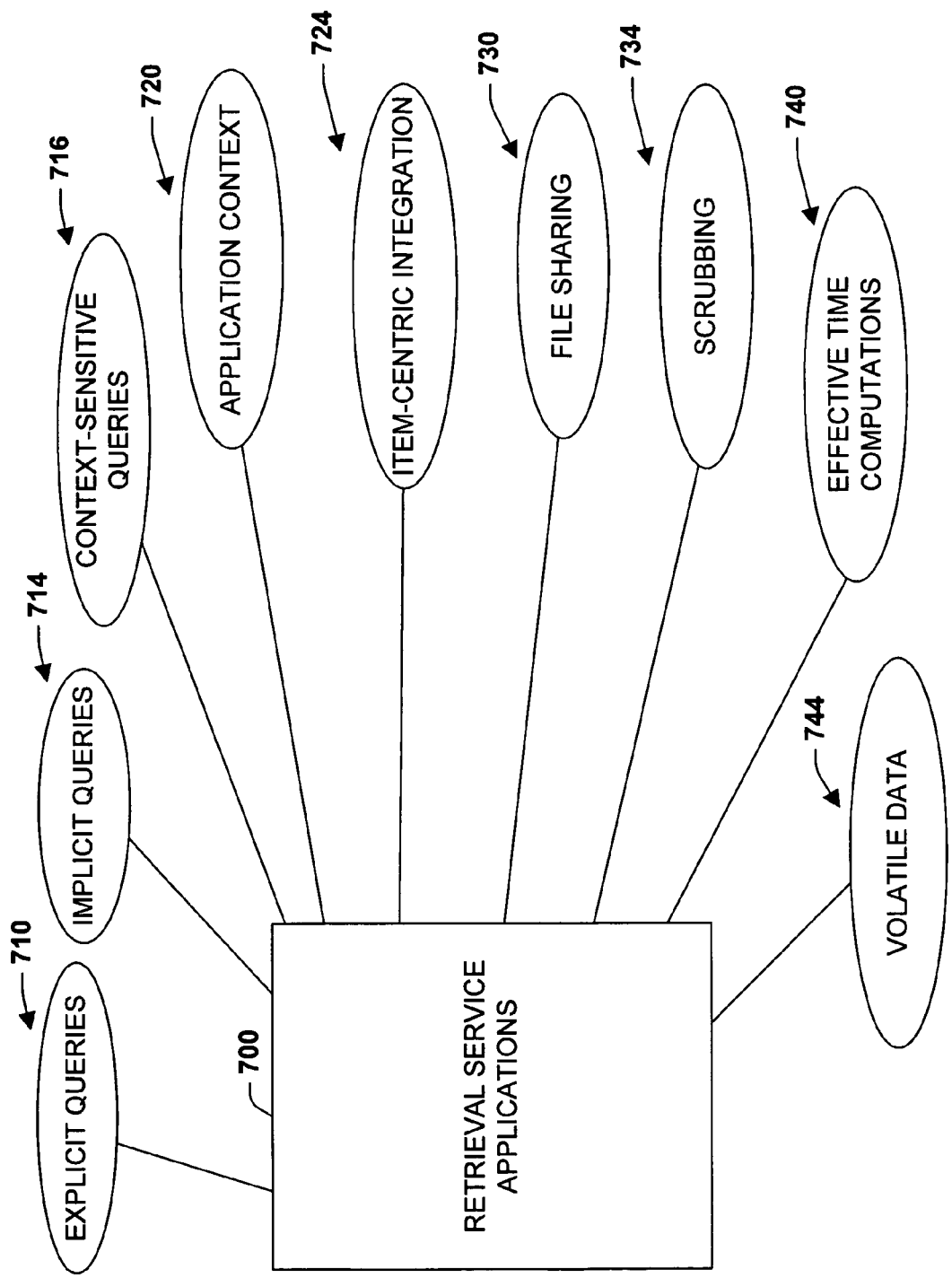
FIG. 7 illustrates retrieval service applications that can be employed with user activity or interaction data.

FIG. 7 illustrates various retrieval service applications 700. In one aspect, explicit queries 710 and/or implicit queries 714 can be supported. Explicit queries 710 are directed by the user to find information of interest (e.g., show all data references relating to a meeting or date). Implicit queries 714 can in some cases be derived from the explicit query 710. For example, a user could have their desktop phone messages linked to their e-mail system or other message system. If a phone call were to arrive from selected individuals, the e-mail system could automatically retrieve e-mail relating to the individual via implicit query 714. In another example, at a predetermined interval before an upcoming meeting, the user's calendar system could trigger queries to recall data from past meetings or information relating to individuals attending the upcoming meeting. Also, implicit queries 714 may be generated based upon reasoning processes associated with the user's current context or query (e.g., a query composed of important words in recently read paragraphs).

Proceeding to 716, other types of queries support context-sensitive queries. These types of queries include providing additional selection options to edit or refine searches. For example, queries may be directed to a particular type of application or location (e.g., apply this query to mail folder only). At 720, the context of an application can be considered when performing a query. For example, if a photo application is being used, then the query can be refined to only search for images. At 724, item-centric integrations can be performed. This includes operating system actions that support interface actions such as mouse click functions, tagging items, updating metadata files, deleting items, editing items or content, and so forth.

At 730, file sharing can be performed. For example, the user may specify that one or more other users can inspect or have access to all or a subset of their query/index database (e.g., all users on my project team are permitted access to my project notes). At 734, index scrubbing can occur. Over time, users may desire to remove one or more items from their index. In accordance with this activity, users can specify specific items to remove or specify general topic areas that can be automatically scrubbed by the system (e.g., remove thumbnails related to my birthday two years ago). Other actions could occur based upon logical or reasoning processes such as if an item were accessed fewer than a certain number of times in a predetermined period, then the item could be automatically removed if desired.

At 740, effective time computations are considered. As an example, the date that's relevant or useful concerning a file (during data presentation to a user) is the date it was changed, the date for presenting mail is usually the date it was delivered (and thus approximately when the user saw it), and the useful date for an appointment is the date the appointment occurs. It is noted that all time information recorded and indexed and that useful date information can be utilized for presentation of information. Thus, for appointments, various tasks can occur such as indexing the time mail was sent, the time it was updated (if that happened), the time the user accepted/declines, and the time the meeting occurred, for example. However, typically one time is selected for display although more than one time can be provided.

As noted above, certain data can be marked as having been previously observed by analyzing file elements associated with a file type. For example, a text document may contain a field indicating when a file was open or last edited. With respect to calendar appointments however, merely creating an index from when the calendar was created is likely to be of minor benefit to people because sometimes meetings are created well in advance of the actual meeting date. Thus, when indexing a calendar appointment, the actual meeting data as opposed to time of creation can be tracked. This type of effective time consideration enables users to retrieve information in a manner more suited to memory recall. At 744, the volatility of data is considered and processed. This type of processing involves indexing of data into a persistent form during intermittent operations. As can be appreciated, various automated background operations are possible.

Figure 8:
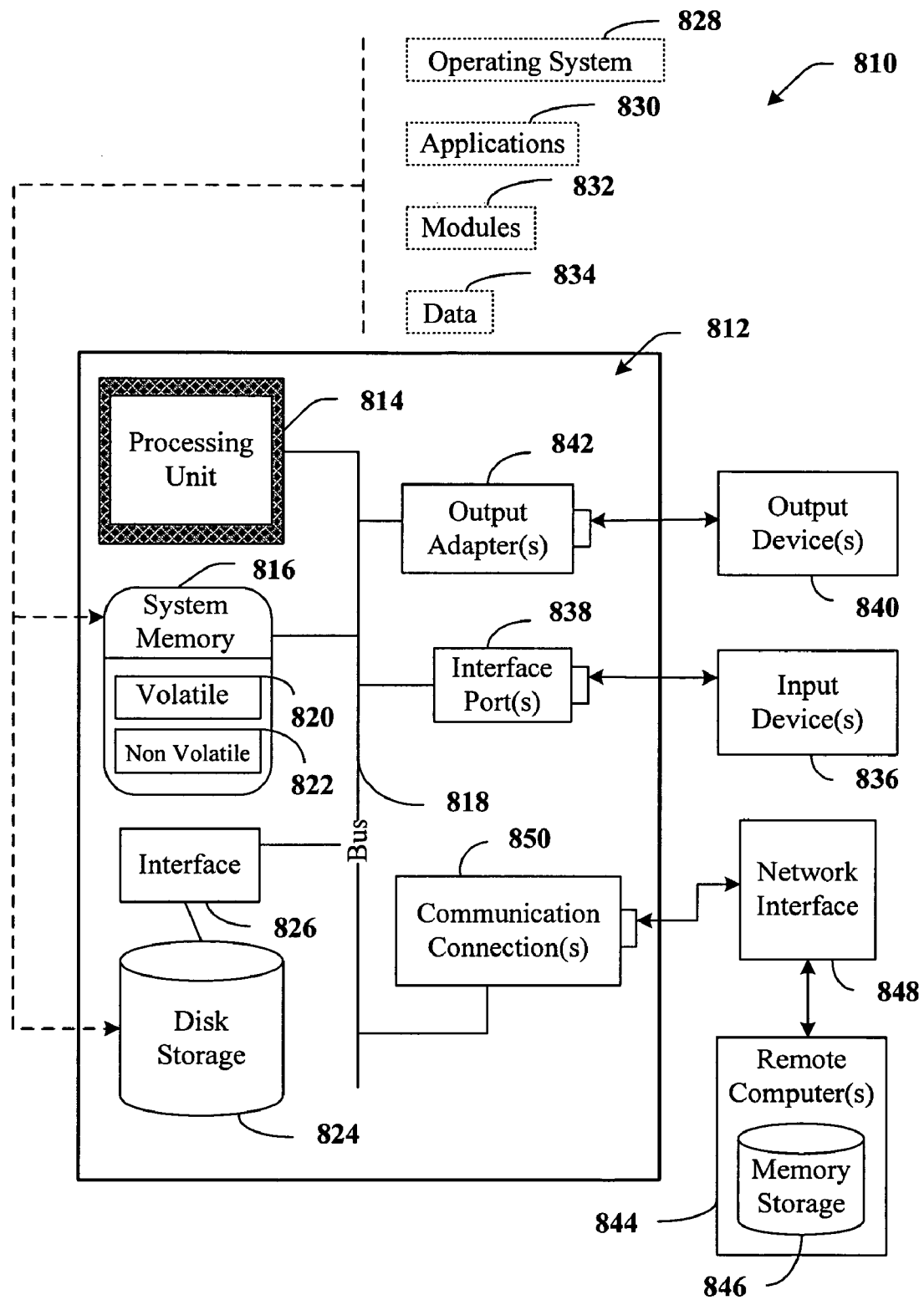
FIG. 8 is a schematic block diagram illustrating a suitable operating environment.

With reference to FIG. 8, an exemplary environment 810 for implementing various aspects described herein includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that various components described herein can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
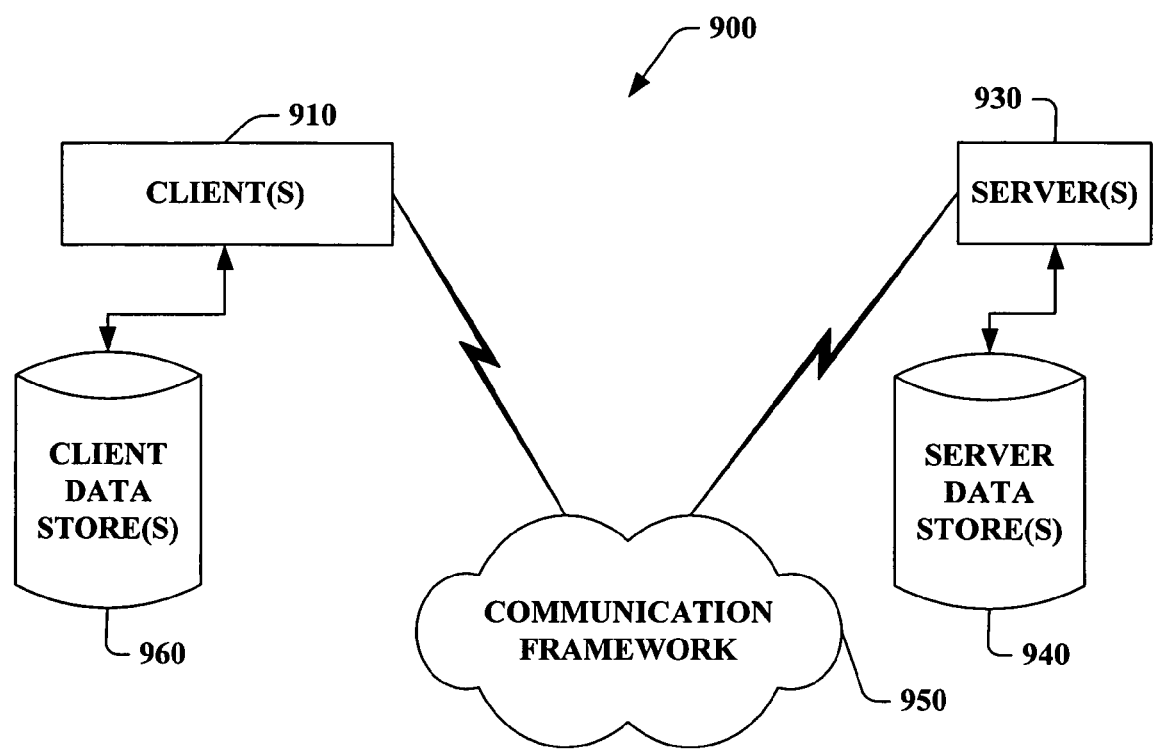
FIG. 9 is a schematic block diagram of a sample-computing environment.

FIG. 9 is a schematic block diagram of a sample-computing environment 900 that can be employed. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the components described herein, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented data manipulation system, comprising:
   a processor;
   a display device for presenting information;
   a computer readable storage medium operationally coupled to the processor and storing computer executable instructions, the computer executable instructions, when executed by the processor, implement components comprising:
   a tagging component that automatically associates one or more data items with one or more tags, the associated tag(s) are weighted to indicate a quantity or nature of interaction with, or attention to, the data item(s) by at least one user, to facilitate presentation of the data to the at least one user through the display device in response to the at least one user's subsequent interaction with the, or related, data item(s);
   a manipulation tool that processes, via the processor, the data items to determine a subset of data items based at least in part on the at least one user's interaction with the data items, the manipulation tool also provides indexing procedures that weight a subset(s) of the data items differently for retrieval depending on a status of annotations indicating attention or interaction with data items; and
   wherein, the computer readable storage medium retains at least one of the data, the associated tags, or their weightings.

2. The system of claim 1, the data items include documents, files, email messages, calendar appointment, web pages, subsections within the data items, or cross-item abstractions.

3. The system of claim 1, where a first tag of the one or more tags represents a location that the at least one user last accessed the associated data item, or represents a location history of times that the at least one user has accessed or interacted with the associated data item.

4. The system of claim 1, where a first tag of the one or more tags represents a time the at least one user last accessed the associated data item, a total number of times that the associated data item has been accessed, represents a frequency that the associated data item has been accessed within a period of time extending into the past, or represents a frequency that the associated data item has been accessed within one or more arbitrarily specified periods of time.

5. The system of claim 1, further comprising a component that encodes higher-order statistics of frequency of access over time.

6. The system of claim 1, further comprising a viewer that allows the at least one user to retrieve at least one data item of the one or more data items based on functions of the one or more tags, a viewer that allows the at least one user to sort or filter retrieved data items based on functions of the one or more tags, or a viewer that presents retrieved data items of the one or more data items based on functions of the one or more tags.

7. A computer implemented method for analysis of user activities with data items, comprising:
   employing a processor executing computer executable instructions stored on a computer readable storage medium to implement the following acts:
   monitoring a user's interaction with the data items;
   automatically tagging the data items reflecting the quantity or nature of interaction of the user with the data items, where the tags have an associated weighting reflecting the degree of interaction;
   employing the tags to further process the data items into a subset of data items in accordance with future user activities relating to the data or a subset thereof;
   providing indexing procedures that weight subcomponents of the data items differently for retrieval depending on a status of annotations indicating attention or interaction with data items; and
   presenting the data or subset thereof to the user based upon at least one of the future user activity, the tags, or the tag weightings.

8. The method of claim 7, storing data within an attentional annotation associated with the data items in a separate database or within a data structure embedded in the data items.

9. The method of claim 8, the data items compose a computer readable storage medium.

10. The method of claim 9, the storage medium is a data item that includes text, graphics, and related data components.

11. The method of claim 7, the indexing procedures overlook or delete information in data items depending on a status of annotations indicating attention or interaction with data items.

12. The method of claim 7, further comprising an index that is compressed by removing components that have not been attended to or interacted with by computer users.

13. The method of claim 12, further comprising an index that is compressed by removing components that are lesser attended to or interacted with components of data items.

14. The method of claim 12, further comprising providing a ranking score used for retrieval, to yield more weight to terms or objects that appear in sections of a data item that a user has attended to or has interacted with.

15. The method of claim 12, further comprising employing attentional annotations to automatically or semi-automatically generate queries based on regions that have been attended to or interacted within the past and/or present, or employing attentional annotations to provide differential access to items or differential display of items that have been attended to or interacted within the past and/or present.

16. A computer implemented system for analyzing user activities with data items, comprising:
  a processor;
  a display for presenting a user interface;
  a computer readable storage medium storing computer executable instructions, the computer executable instructions, when executed by the processor, implement components comprising:
  means for determining, by the processor, user activities with respect to one or more data items;
  means for tagging the data items based at least in part on the user activities, where the tags have an associated weighting to reflect the degree of interaction by the user with the data items;
  means for storing the data items in the computer readable storage medium based in part on the tags, and their level of weighting, associated with the data items;
  means for processing, by the processor, the data items and their associated weighted tags, processing includes providing indexing procedures that weight the data items and subsets of the data items differently for retrieval depending on a status of annotations indicating attention or interaction with the data items; and
  means for presenting the data items, via the user interface, to at least one user, based upon the at least one user's subsequent interaction with the data items, or related data items, where the data items are presented in accordance with the weighted tags.

17. The system of claim 16, further comprising means for encoding attentional annotations for the data items and means for encoding attentional annotations for subcomponents within the data items, where the annotations capture pointers indications of each of the subcomponents and resulting user attention that has been received for the subcomponents.

* * * * *